United States Patent

Abbott

[15] 3,671,669

[45] June 20, 1972

[54] RECOVERY OF HORIZONTAL SYNC PULSES FROM A COMPOSITE SYNCHRONIZING FORMAT

[72] Inventor: Robert Plowden Abbott, Freehohd, N.J.

[73] Assignee: Bell Telephone Laboratories, Incorporated, Murray Hill, Berkely Heights, N.J.

[22] Filed: Dec. 14, 1970

[21] Appl. No.: 97,567

[52] U.S. Cl. ....................................178/7.3 S, 178/69.5 TV

[51] Int. Cl. ........................................................H04n 5/10

[58] Field of Search ......................178/7.3 R, 7.3 S, 69.5 TV, 178/69.5 G; 328/39, 63, 164

[56] References Cited

UNITED STATES PATENTS

| | | | |
|---|---|---|---|
| 2,824,228 | 2/1958 | Carmichael | 328/39 |
| 3,472,962 | 10/1969 | Sanford | 178/69.5 TV |
| 3,487,167 | 12/1969 | Riggin et al. | 178/7.35 X |
| 3,526,714 | 9/1970 | Fisk et al. | 178/69.5 TV |
| 3,567,857 | 3/1971 | Lynn | 178/7.3 S |
| 3,567,860 | 3/1971 | Oliver et al. | 178/69.5 TV |

*Primary Examiner*—Robert L. Richardson
*Attorney*—R. J. Guenther and E. W. Adams, Jr.

[57] ABSTRACT

A synchronizing circuit of a video receiver removes the vertical synchronizing pulses from a composite synchronizing pulse waveform that contains both vertical and horizontal synchronizing pulses. A counter in the synchronizing circuit anticipates the occurrence of a vertical synchronizing pulse by counting the number of horizontal synchronizing pulses and removing the vertical synchronizing pulse to substitute a delayed horizontal synchronizing pulse. The circuit synchronizes within one video frame upon start-up and will not allow any lock-out condition to exist for more than one frame.

6 Claims, 8 Drawing Figures

SYNC RECOVERY CIRCUIT
11

INVENTOR
R. P. ABBOTT
BY David P. Kelley
ATTORNEY

RECOVERY OF HORIZONTAL SYNC PULSES FROM A COMPOSITE SYNCHRONIZING FORMAT

BACKGROUND OF THE INVENTION

This invention relates to pulse circuitry and, more particularly, to such circuitry which is used in the synchronizing functions of a video receiver.

Synchronization of the video receiver with a transmitter must be maintained to insure stable reproduction of the transmitted video image. Phase-locking techniques are generally utilized in the synchronizing functions of the receiver to maintain coupling between the receiver and the transmitted synchronizing information in the video signal. The prior art technique is to generate a complex synchronizing format comprising synchronizing, equalizing and blanking pulses which are included in the transmission of the video signal for the conventional synchronizing circuitry at the receiver. The generation of this complex standardized synchronizing format at the transmitter requires sophisticated electronic equipment, which is not a practical approach for use in closed circuit television and other monitoring systems.

Closed circuit television systems, such as Picturephone, generally operate with a simplified synchronizing format which may simply use pulses of a given duration for the vertical synchronizing, and pulses of a substantially shorter duration for the horizontal synchronizing. The presence of the vertical synchronizing pulse in the simplified composite format can cause excessive jitter of the conventional phase-locked horizontal oscillator in the receiver. Unfortunately, an additional filter in the phase-locked oscillator of the receiver required to reduce the jitter also undesirably affects the operational characteristics of the phase-locked oscillator. These operational characteristics must be of optimum value to maintain stable reproduction of the transmitted television image at the receiver during adverse transmission conditions.

SUMMARY OF THE INVENTION

In the present invention, the composite synchronizing signal is applied to an inhibit gate and a one-line delay circuit in the receiver. A counter reset generator and a pulse generator are driven by the composite signal; this apparatus in turn drives a pulse counter circuit which controls the inhibit gate. The number of horizontal synchronizing pulses is counted by the pulse counter which switches the inhibit gate to the delayed horizontal synchronizing pulse just prior to the occurrence of a vertical synchronizing pulse. Thus, the invention removes the vertical synchronizing pulses from the composite synchronizing signal to substitute delayed horizontal synchronizing pulses to provide a recovered synchronizing signal of equally spaced horizontal synchronizing pulses.

The counter reset generator and the pulse generator control the pulse counter and insure that synchronization will occur within one video frame upon start-up and will not allow any lock-out condition, which is lack of synchronization between the transmitter and receiver, to exist for more than one frame. The pulse generator eliminates the possibility of a false counter start upon the occurrence of an extra horizontal synchronizing pulse in alternate fields of a two-fields-per-frame horizontal interlace transmission system.

A feature of the invention is an inhibit gate that switches to a delayed horizontal synchronizing pulse in anticipation of a vertical synchronizing pulse in the composite signal to provide a recovered synchronizing signal of equally spaced horizontal synchronizing pulses.

Another feature of the invention is a pulse counter that is driven by a pulse generator and reset by a counter reset generator to count the number of horizontal synchronizing pulses to control the inhibit gate and insure that a lock-out condition does not exist for more than one frame.

DETAILED DESCRIPTION

Figure 1:
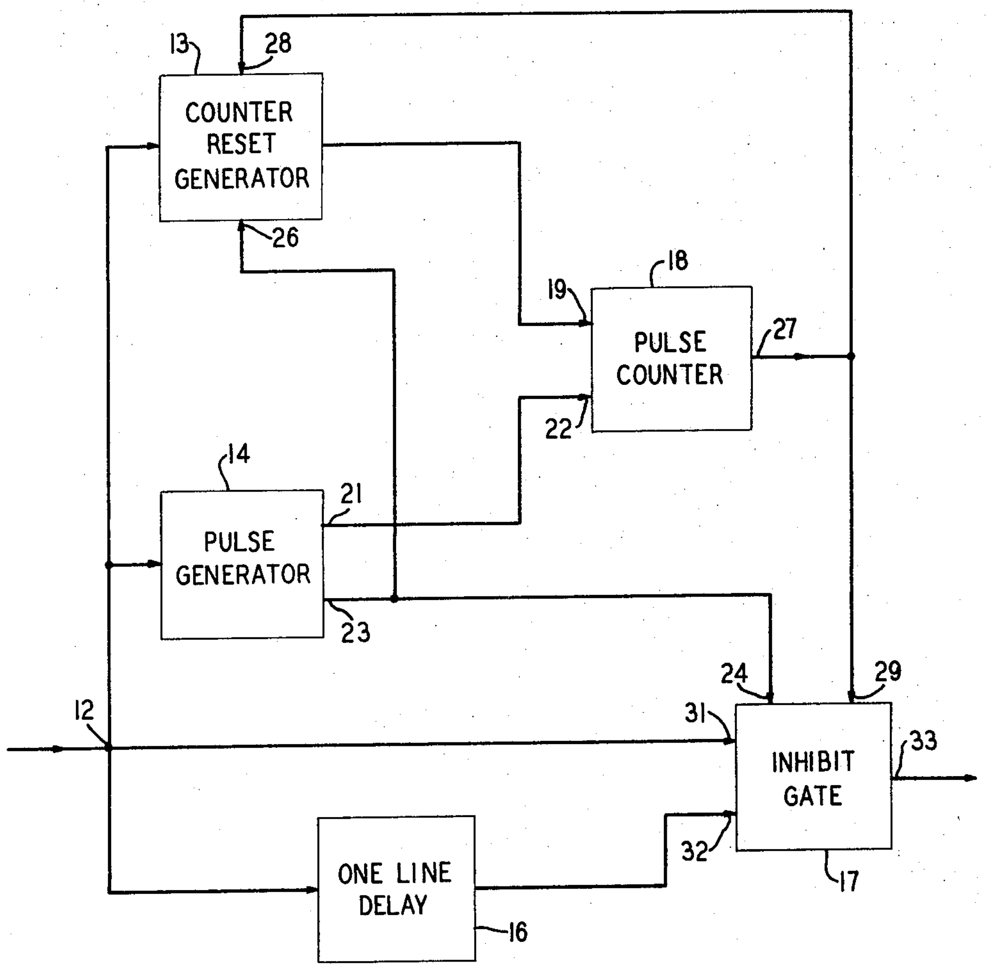
FIG. 1 is a block diagram of an illustrative embodiment of the invention.

FIG. 1 is a block diagram in a video receiver of an illustrative embodiment of the invention comprising an input terminal 12, to which is applied the composite synchronizing signal, connected to a counter reset generator 13, a pulse generator 14, a one-line delay 16, an inhibit gate 17 and a pulse counter 18 connected to the counter reset generator 13 and the pulse generator 14. The pulse generator 14 has output terminals 21 and 23. The output terminal 21 is connected to the counter drive input terminal 22 of the pulse counter 18. The output terminal 23 is connected to a control terminal 24 of the inhibit gate 17 and also to an input terminal 26 of the counter reset generator 13. The pulse counter 18 has its output terminal 27 connected to an input terminal 28 of the counter reset generator 13. The output terminal 27 is also connected to another control terminal 29 of the inhibit gate 17. The second input terminal 32 of the inhibit gate 17 is connected to the output of the one-line delay 16. The counter reset generator 13, the pulse generator 14 and the pulse counter 18 are means for controlling the inhibit gate 17 in anticipation of a vertical synchronizing pulse. The output terminal 33 of the inhibit gate 17 supplies the recovered synchronized output signal for the entire circuit.

The one-line delay 16 may, for example, comprise three monostable multivibrators connected in tandem. The leading edge of each synchronizing pulse triggers the first monostable multivibrator which has an output pulse with a duration equal to one-half of the spacing between two consecutive horizontal synchronizing pulses of the input signal. The second monostable multivibrator is triggered by the first multivibrator. The second multivibrator has an output pulse also equal to one-half of the time between two consecutive horizontal synchronizing pulses. The second monostable multivibrator triggers the third monostable multivibrator which has an output pulse of the same duration as a horizontal synchronizing pulse. Thus, the output of the one-line delay circuit is a delayed horizontal synchronizing pulse which coincides with the next consecutive horizontal synchronizing pulse appearing at the input terminal 12.

The counter reset generator 13, the pulse generator 14, the pulse counter 18 and the inhibit gate 17 may all be constructed by digital circuitry which is known to those working in the art.

In operation, the composite synchronizing signal is applied to the first input terminal 31 of the inhibit gate 17. The second input terminal 32 of the inhibit gate 17 has applied thereto the composite synchronizing signal delayed by the one-line delay 16. The composite synchronizing signal passes through the inhibit gate 17 as long as horizontal synchronizing pulses are present at the terminal 31, but means for controlling the inhibit gate 17 causes the gate to block the vertical synchronizing pulses in the composite signal at the terminal 31 after the last horizontal synchronizing pulse passes through the inhibit gate 17 and switches to the delayed horizontal synchronizing pulse presented at the terminal 32.

The means for controlling the inhibit gate 17 comprises the counter reset generator 13 and the pulse generator 14 to each of which is applied the composite synchronizing signal and the pulse counter 18. The output terminal 21 of the pulse generator 14 supplies a counter drive signal which is derived from the composite input signal for the counter drive input terminal 22 of the pulse counter 18. The output terminal 23 switches from a low to a high level for a fixed duration when the lagging edges of the pulses in the composite input signal appear at the input when the output terminal 23 is at a low level. The terminal 23 supplies pulses of a fixed duration for the inhibit gate 17 and the counter reset generator 13. The counter reset generator 13 has an output signal which starts the count or resets the pulse counter 18 at the beginning of each field. The pulse counter 18 has an output terminal 27 connected to the terminal 28 of the counter reset generator and the control terminal 29 of the inhibit gate 17. With the three input signals, the counter reset generator 13 resets the pulse counter 27 after the pulse counter counts a given number of horizontal synchronizing pulses in each field or at the beginning of the second field of each frame independent of the state of the pulse counter 18. The counter-dependent reset results from the feed-back of the pulse counter 18 output signal, while the independent reset is provided by gating the composite input signal with the output of the pulse generator 14 internally in the counter reset generator 13. The output terminal 27 of the pulse counter 18 is connected to the control terminal 29 of the inhibit gate 17 and is responsible for inhibiting the normal composite synchronizing signal path just after the occurrence of the final horizontal synchronizing pulse in each field. The other control terminal 24 is driven by the pulse generator 14 and is responsible for opening the signal path of the delayed horizontal synchronizing pulse shortly before that pulse appears at terminal 32.

Figure 2A:
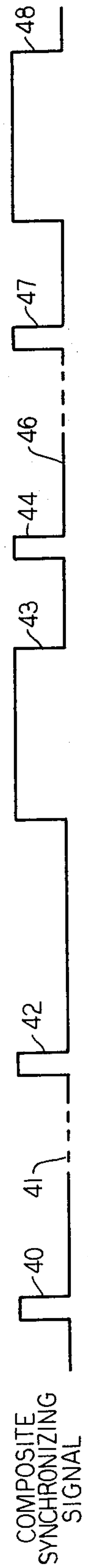
FIGS. 2A, 2B, 2C, 2D, 2E, 2F and 2G constitute an abbreviated waveform timing diagram used to facilitate an understanding of the operation of FIG. 1.

A further understanding of FIG. 1 can be achieved by studying the abbreviated waveform timing diagram shown by FIGS. 2A, 2B, 2C, 2D, 2E, 2F and 2G. FIG. 2A depicts a composite synchronizing signal in abbreviated form during two fields of a video frame which is applied to the input terminal 12 of FIG. 1. A pulse 40 is the first horizontal synchronizing pulse in the first video field. A pulse 42 is the final horizontal synchronizing pulse in the first video field. A section 41 of the diagram represents the horizontal synchronizing pulses occurring between pulses 40 and 42 which are omitted in order to simplify the drawing. The number of horizontal pulses in each field is determined by the number of horizontal scanning lines in the field pattern. A vertical synchronizing pulse 43 is the vertical synchronizing pulse which occurs between two adjacent fields. A pulse 44 is the first horizontal synchronizing pulse in the second video field. A pulse 47 is the last horizontal synchronizing pulse in the second video field. Again, section 46 represents the horizontal synchronizing pulses which have been omitted for the sake of simplicity. In the second field, there is one more horizontal synchronizing pulse than in the first field which is necessitated by using a two-to-one positive interlace scanning format which has an odd number of scanning lines in each video frame. A vertical synchronizing pulse 48 is the final synchronizing pulse of the second video field.

Figure 2B:
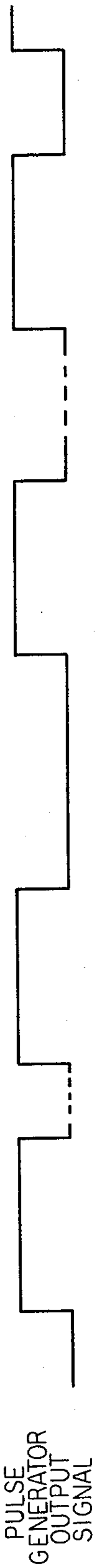
Figure 2C:
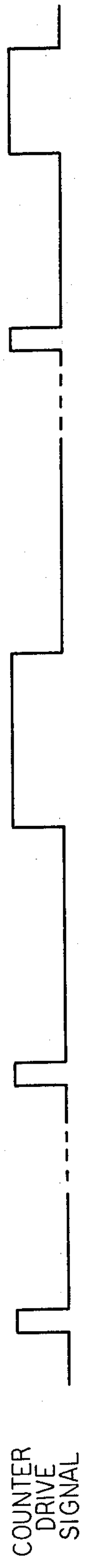
Figure 2D:
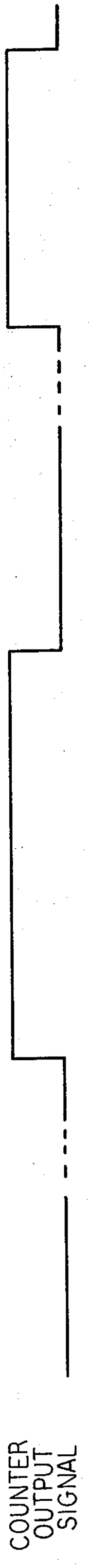

FIG. 2B depicts the output of the pulse generator 14 in FIG. 1 present on the output terminal 23. The pulse generator is triggered to a high output level for a fixed duration by the lagging edge of the synchronizing pulse in the composite synchronizing signal when the pulse generator 14 output level is low. The output of the pulse generator 14 is used to help provide a delayed switching of the inhibit gate 17 and to help provide the reset start-up trigger pulse of the pulse counter 18. FIG. 2C depicts the counter drive signal which is generated by gating the composite synchronizing signal with the output of the pulse generator 14 of FIG. 1. The counter drive signal eliminates the horizontal synchronizing pulse 44 in FIG. 2A which is an extra horizontal synchronizing pulse present in the alternate video fields due to the particular synchronizing format utilized. FIG. 2D depicts the counter output signal of the pulse counter 17 in FIG. 1 which goes high after the appropriate number of horizontal synchronizing pulses are counted to anticipate the occurrence of a vertical synchronizing pulse and remains high until reset by the counter reset generator 13.

Figure 2E:
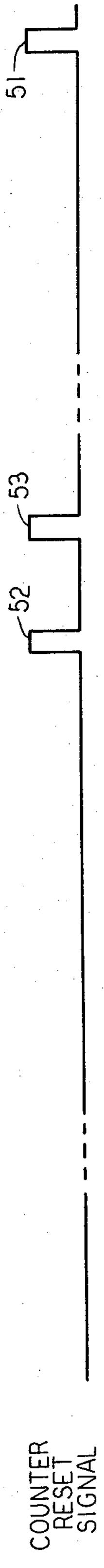
Figure 2F:
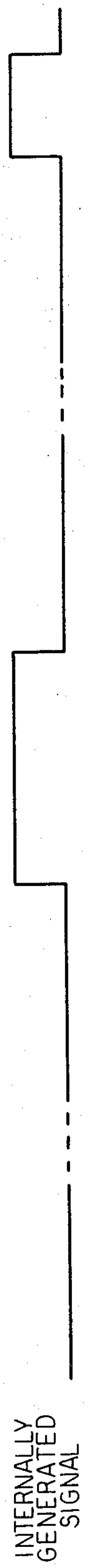

FIG. 2E depicts the counter reset pulse signal which is the output of the counter reset generator 13 of FIG. 1. The counter reset pulse signal insures that the pulse counter 18 is initially started on the correct horizontal synchronizing pulse. The counter reset pulse signal comprises pulses 51, 52 and 53. The pulses 51 and 52 occur once per field and are generated from the lagging edge of the waveform resulting from gating the output signal of the pulse counter 18 with the composite synchronizing signal. The pulse 53 is generated from the lagging edge of the waveform obtained by gating the output signal 2B of the pulse generator 14 with the composite synchronizing pulse signal. The pulse 53 occurs once per frame and insures that the pulse counter 18 has initially started the counting of horizontal synchronizing pulses at the proper point. Once the pulse counter 18 is synchronized properly, pulses 51 and 52 appear in the proper position as shown in FIG. 2E. The pulse 53 is independent of the pulse counter 18 and also insures that a lock-out cannot exceed a maximum interval of one frame.

Figure 2G:
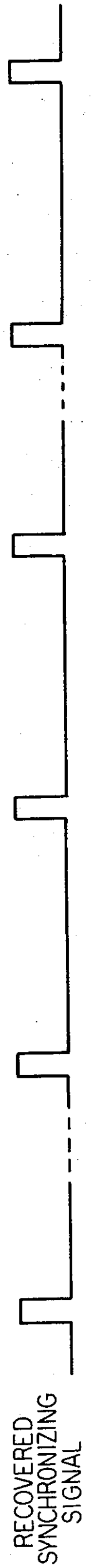

FIG. 2G depicts the output of the inhibit gate 17 which is the recovered synchronizing signal that contains only properly spaced horizontal synchronizing pulses. The vertical synchronizing pulses are gated out by the inhibit gate 17 with waveform 2D. A waveform 2F is generated internally in inhibit gate 17 by gating together waveforms 2B and 2D and controls that portion of the inhibit gate 17 which substitutes the delayed horizontal synchronizing from the one-line delay 16.

In all cases it is to be understood that the foregoing described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A synchronizing signal recovery circuit comprising:
   - an inhibit gate having a first and a second input terminal, said first input terminal being connected to an input source of a composite video synchronizing signal comprising both vertical and horizontal synchronizing pulses, the horizontal synchronizing pulses having a substantially shorter duration than the vertical synchronizing pulses;
   - a delay circuit connected to said input source, said delay circuit having an output terminal connected to said second input terminal; and
   - means for controlling said inhibit gate by counting the same number of horizontal synchronizing pulses in each field supplied by said input source, said means being connected to a first and a second control terminal of said inhibit gate, and said inhibit gate being activated to gate out the vertical synchronizing pulses present at said first input terminal to substitute delayed horizontal synchronizing pulses from said second input terminal supplied by said delay circuit.

2. The synchronizing signal recovery circuit of claim 1 wherein said delay circuit has a delay substantially equal to the interval between consecutive horizontal synchronizing pulses.

3. The synchronizing signal recovery circuit of claim 1 wherein said means for controlling said inhibit gate comprises a pulse generator and a counter reset generator connected to said input source; said pulse generator having a first and a second output terminal, said first output terminal being connected to said first control terminal and said second output terminal being connected to a pulse counter; said pulse counter having another input connected to the output of said counter reset generator to insure that said counter is reset properly; and said first output terminal of said pulse generator being connected to said second control terminal for inhibiting said inhibit gate before the occurrence of a vertical synchronizing pulse to allow the substitution of a horizontal synchronizing pulse from said delay circuit to produce an output signal having horizontal synchronizing pulses substantially equally based.

4. The synchronizing signal recovery circuit of claim 3 wherein said pulse generator produces a pulse output of a fixed duration for said first output terminal, said second output terminal providing an output pulse which results from gating the output signal of said first output terminal with said input source to produce a counter drive signal having an equal number of horizontal synchronizing pulses in each field of a video frame.

5. The synchronizing signal recovery circuit of claim 3 wherein said counter reset generator resets said pulse counter by one pulse per field which is dependent upon said pulse counter, and one pulse per frame which is independent of said pulse counter and is produced by gating the output signal of the first output terminal of said pulse generator with said input source.

6. A synchronizing signal recovery circuit comprising:

an input source of a composite video synchronizing signal comprising both vertical and horizontal synchronizing pulses, the horizontal synchronizing pulses having a substantially shorter duration than the vertical synchronizing pulses;

a delay circuit connected to said input source having a delay substantially equal to the interval between horizontal pulses, the output of said delay circuit and of said input source being each connected to an input terminal of an inhibit gate having two control terminals and an output; and a pulse generator and a counter reset generator connected to said input source, said pulse generator having two output terminals, one of said two output terminals being connected to one of said control terminals and the other output terminal being connected to a pulse counter, said pulse counter having another input connected to the output of said counter reset generator to insure that said counter is reset properly, the output of said pulse counter being connected to the other of said control terminals for inhibiting said inhibit gate before the occurrence of a vertical synchronizing pulse to allow the substitution of a horizontal synchronizing pulse from said delay circuit to produce an output signal having horizontal synchronizing pulses substantially equally spaced.

* * * * *